US009335617B2

(12) United States Patent
Tsubota et al.

(10) Patent No.: US 9,335,617 B2
(45) Date of Patent: May 10, 2016

(54) PROJECTOR

(75) Inventors: Hirono Tsubota, Osaka (JP); Atsuya Hirano, Osaka (JP); Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 90 days.

(21) Appl. No.: 13/883,813

(22) PCT Filed: Nov. 2, 2011

(86) PCT No.: PCT/JP2011/075296
§ 371 (c)(1),
(2), (4) Date: May 7, 2013

(87) PCT Pub. No.: WO2012/063703
PCT Pub. Date: May 18, 2012

(65) Prior Publication Data
US 2013/0222771 A1    Aug. 29, 2013

(30) Foreign Application Priority Data
Nov. 10, 2010   (JP) ................................. 2010-252128

(51) Int. Cl.
*G03B 21/20* (2006.01)
*H04N 9/31* (2006.01)
(Continued)

(52) U.S. Cl.
CPC ............ *G03B 21/206* (2013.01); *G02B 26/101* (2013.01); *G02B 27/283* (2013.01); *G03B 21/00* (2013.01); *G03B 21/2033* (2013.01); *G03B 21/2066* (2013.01); *G03B 21/2073* (2013.01); *G03B 21/28* (2013.01); *G06F 3/0412* (2013.01); *G06F 3/0421* (2013.01); *H04N 9/3129* (2013.01); *H04N 9/3147* (2013.01); *H04N 9/3158* (2013.01); *H04N 9/3161* (2013.01); *H04N 9/3164* (2013.01);
(Continued)

(58) Field of Classification Search
CPC ........... G03B 21/2073; G03B 21/2033; G03B 21/2066; H04N 9/3129; H04N 9/3158; H04N 9/3161; H04N 9/3164; H04N 9/3167
USPC .............. 353/20, 30, 82, 71, 94; 345/2.2, 1.3; 359/204.3, 204.1, 204.4, 207.9
See application file for complete search history.

(56) References Cited

U.S. PATENT DOCUMENTS 6,937,372 B2 *   8/2005   Kandori et al. ............. 359/198.1
7,173,605 B2 *   2/2007   Fong et al. ..................... 345/168
(Continued)

FOREIGN PATENT DOCUMENTS

JP   2000075241 A   3/2000
JP   2005038422 A   2/2005
(Continued)

OTHER PUBLICATIONS

International Search Report and Written Opinion, issued from PCT/JP2011/075296 with an international filing date of Nov. 2, 2011, mailed on Jan. 24, 2012.

*Primary Examiner* — William C Dowling
(74) *Attorney, Agent, or Firm* — Baker & Hostetler LLP

(57) ABSTRACT

This projector is configured to allocate a first projection laser beam corresponding to a first image signal and a second projection laser beam corresponding to a second image signal different from the first image signal to a first area and a second area not overlapping with the first area, respectively, to project the first projection laser beam and the second projection laser beam.

20 Claims, 9 Drawing Sheets

(51) Int. Cl.

| | | |
|---|---|---|
| *G02B 26/10* | (2006.01) | |
| *G02B 27/28* | (2006.01) | |
| *G03B 21/00* | (2006.01) | |
| *G06F 3/041* | (2006.01) | |
| *G06F 3/042* | (2006.01) | |
| *G03B 21/28* | (2006.01) | |
| *G02B 27/10* | (2006.01) | |

(52) U.S. Cl.
CPC .......... *H04N 9/3167* (2013.01); *H04N 9/3173* (2013.01); *G02B 27/1066* (2013.01)

(56) References Cited

U.S. PATENT DOCUMENTS

| | | | |
|---|---|---|---|
| 7,686,455 B2 * | 3/2010 | Yoshimura et al. | 353/31 |
| 7,891,816 B2 * | 2/2011 | Silverstein et al. | 353/8 |
| 8,123,361 B2 * | 2/2012 | Nagashima et al. | 353/30 |
| 8,408,720 B2 * | 4/2013 | Nishigaki et al. | 353/94 |
| 8,419,195 B2 * | 4/2013 | Nishigaki et al. | 353/99 |
| 8,585,206 B2 * | 11/2013 | Gollier | 353/20 |
| 2010/0033791 A1 | 2/2010 | Nakanishi | |
| 2010/0060857 A1 * | 3/2010 | Richards et al. | 353/7 |
| 2012/0032875 A1 * | 2/2012 | Sprowl et al. | 345/156 |

FOREIGN PATENT DOCUMENTS

| | | |
|---|---|---|
| JP | 2007108570 A | 4/2007 |
| JP | 2009123006 A | 6/2009 |
| JP | 2009198988 A | 9/2009 |
| JP | 2010044170 A | 2/2010 |
| JP | 2010-244484 A | 10/2010 |
| WO | 2012063703 A1 | 5/2012 |

* cited by examiner

DRIVING SENSITIVITY OF SCANNING PORTION: LARGE

DRIVING SENSITIVITY OF SCANNING PORTION: SMALL

PROJECTOR

CROSS-REFERENCE TO RELATED APPLICATIONS

The present application is a national stage entry of PCT/JP2011/075296, filed Nov. 2, 2011, which claims the benefit of Japanese Application Serial No. 2010-252128, filed Nov. 10, 2010.

TECHNICAL FIELD

The present invention relates to a projector, and more particularly, it relates to a projector capable of projecting images on different areas.

BACKGROUND ART

In general, a projector capable of projecting an image on different areas is known. Such a projector is disclosed in Japanese Patent Laying-Open No. 2007-108570, for example. In the aforementioned Japanese Patent Laying-Open No. 2007-108570, there is disclosed a projector displaying the same image on two different areas by dispersing projection light (projection laser beams) with a half mirror.

PRIOR ART

Patent Document

Patent Document 1: Japanese Patent Laying-Open No. 2007-108570

SUMMARY OF THE INVENTION

Problem to be Solved by the Invention

However, although the projector according to the aforementioned Laying-Open No. 2007-108570 can display the same image on the two different areas by dispersing the projection light with the half mirror, there is such a problem that the projector cannot display different images on the two areas different from each other.

The present invention has been proposed in order to solve the aforementioned problem, and an object of the present invention is to provide a projector capable of displaying different images on areas different from each other.

Means for Solving the Problem and Effects of the Invention

A projector according to an aspect of the present invention includes a projection laser beam generation portion outputting a first projection laser beam and a second projection laser beam corresponding to a first image signal and a second image signal different from the first image signal, which are input, respectively, and a single scanning portion scanning the first projection laser beam and the second projection laser beam, and is configured to allocate the first projection laser beam and the second projection laser beam both scanned by the scanning portion to a first area and a second area not overlapping with the first area, respectively, to project the first projection laser beam and the second projection laser beam.

As hereinabove described, the projector according to the aspect is configured to allocate the first projection laser beam corresponding to the first image signal and the second projection laser beam corresponding to the second image signal different from the first image signal to the first area and the second area not overlapping with the first area, respectively, to project the first projection laser beam and the second projection laser beam, whereby the projection laser beams based on the image signals different from each other can be allocated to the areas different from each other to be projected, and hence different images can be displayed on the areas different from each other.

Preferably, the aforementioned projector according to the aspect is configured to allocate the first projection laser beam and the second projection laser beam to the first area and the second area, respectively, for at least one of each scanning section scanned by the scanning portion and each frame scanned by the scanning portion to project the first projection laser beam and the second projection laser beam. According to this structure, the projection laser beams based on the image signals different from each other can be projected on the areas different from each other for at least one of each scanning section scanned by the scanning portion and each frame scanned by the scanning portion, and hence different images can be easily displayed on the areas different from each other.

Preferably, the aforementioned projector according to the aspect further includes a polarization switching portion switching the first projection laser beam and the second projection laser beam to a first polarized beam and a second polarized beam, respectively, and a polarization allocating portion allocating the first polarized beam and the second polarized beam to the first area and the second area, respectively, to project the first polarized beam and the second polarized beam. According to this structure, the polarization allocating portion can allocate the first projection laser beam and the second projection laser beam to the first area and the second area, respectively, according to polarization, and hence different images can be easily displayed on the areas different from each other.

Preferably in this case, the first polarized beam includes a P-polarized beam, the second polarized beam includes an S-polarized beam, the polarization switching portion is configured to switch the first projection laser beam and the second projection laser beam to the p-polarized beam and the S-polarized beam, respectively, and the polarization allocating portion is configured to allocate the P-polarized beam and the S-polarized beam to the first area and the second area, respectively, to project the P-polarized beam and the S-polarized beam. According to this structure, the polarization allocating portion can easily allocate the first projection laser beam and the second projection laser beam according to whether the polarized beam is the P-polarized beam or the S-polarized beam.

Preferably in the aforementioned projector including the polarization switching portion and the polarization allocating portion, the polarization switching portion includes either a liquid crystal element or a Faraday element. According to this structure, the polarization of the first projection laser beam and the polarization of the second projection laser beam can be easily switched by either the liquid crystal element or the Faraday element.

Preferably in the aforementioned projector including the polarization switching portion and the polarization allocating portion, the polarization allocating portion includes either a polarizing beam splitter or a half mirror. According to this structure, the first projection laser beam and the second projection laser beam can be easily allocated by either the polarizing beam splitter or the half mirror.

Preferably, the aforementioned projector allocating the laser beams for at least one of each scanning section scanned by the scanning portion and each frame scanned by the scanning portion to project the laser beams is configured to allocate the first projection laser beam and the second projection laser beam to the first area and the second area, respectively, for each scanning section scanned by the scanning portion to project the first projection laser beam and the second projection laser beam. According to this structure, the projection laser beams based on the image signals different from each other can be projected on the areas different from each other for each scanning section scanned by the scanning portion, and hence different images can be easily displayed on the areas different from each other.

Preferably in this case, the projector further includes an image synthesizing portion generating a synthetic image on the basis of the first image signal and the second image signal, and is configured to allocate the first projection laser beam and the second projection laser beam to the first area and the second area, respectively, for each scanning section scanned by the scanning portion on the basis of the synthetic image to project the first projection laser beam and the second projection laser beam. According to this structure, the image synthesizing portion can synthesize different images into one image, and hence the projection laser beams of the different images can be easily scanned by the single scanning portion.

Preferably in the aforementioned projector including the image synthesizing portion, the image synthesizing portion is configured to generate the synthetic image by arranging an image corresponding to the first image signal in an even row and arranging an image corresponding to the second image signal in an odd row and the scanning portion is configured to perform a scan in an interlaced format, and the projector is configured to allocate the first projection laser beam scanned in a scanning section of the even row and the second projection laser beam scanned in a scanning section of the odd row to the first area and the second area, respectively, to project the first projection laser beam and the second projection laser beam. According to this structure, in scanning in an interlaced format starting scanning of even rows (odd rows) after scanning of all the odd rows (even rows) of scanning lines of one image, scanning of the image corresponding to the second image signal arranged in the odd row (the image corresponding to the first image signal arranged in the even row) of one synthetic image is all finished, and thereafter scanning of the image corresponding to the first image signal arranged in the even row (the image corresponding to the second image signal arranged in the odd row) is started. Consequently, for one synthetic image, only a single allocation operation is required, and different images can be easily displayed on the areas different from each other.

Preferably in this case, the projector further includes a polarization switching portion switching the first projection laser beam and the second projection laser beam to a first polarized beam and a second polarized beam, respectively, and a polarization allocating portion allocating the first polarized beam and the second polarized beam to the first area and the second area, respectively, to project the first polarized beam and the second polarized beam, and is configured to switch the first polarized beam and the second polarized beam in a vertical blanking interval by the polarization switching portion and allocate the first projection laser beam including the first polarized beam scanned in the scanning section of the even row and the second projection laser beam including the second polarized beam scanned in the scanning section of the odd row to the first area and the second area, respectively, by the polarization allocating portion to project the first projection laser beam and the second projection laser beam. According to this structure, the polarization switching portion can switch polarization, utilizing the vertical blanking interval in which no scanning is performed, and hence the first projection laser beam and the second projection laser beam can be allocated without providing a period of time for switching polarization.

Preferably in the aforementioned projector including the image synthesizing portion, the image synthesizing portion is configured to generate the synthetic image by arranging an image corresponding to the first image signal in a lower portion and arranging an image corresponding to the second image signal in an upper portion and the scanning portion is configured to perform a scan in a progressive format, and the projector is configured to allocate the first projection laser beam scanned in a scanning section of the lower portion of the synthetic image and the second projection laser beam scanned in a scanning section of the upper portion of the synthetic image to the first area and the second area, respectively, to project the first projection laser beam and the second projection laser beam. According to this structure, in scanning in a progressive format in which even rows and odd rows are alternately scanned row by row when one image is scanned, scanning of the image corresponding to the second image signal arranged in the upper portion (the image corresponding to the first image signal arranged in the lower portion) of one synthetic image is all finished, and thereafter scanning of the image corresponding to the first image signal arranged in the lower portion (the image corresponding to the second image signal arranged in the upper portion) is started. Consequently, for one synthetic image, only a single allocation operation is required, and different images can be easily displayed on the areas different from each other.

Preferably in this case, the projector further includes a polarization switching portion switching the first projection laser beam and the second projection laser beam to a first polarized beam and a second polarized beam, respectively, and a polarization allocating portion allocating the first polarized beam and the second polarized beam to the first area and the second area, respectively, to project the first polarized beam and the second polarized beam, the image synthesizing portion is configured to synthesize images in a state where a blank area is arranged between the image arranged in the lower portion and the image arranged in the upper portion, and the projector is configured to switch the first polarized beam and the second polarized beam in a period of time in which the blank area is scanned by the polarization switching portion and allocate the first projection laser beam including the first polarized beam scanned in the scanning section of the lower portion of the image and the second projection laser beam including the second polarized beam scanned in the scanning section of the upper portion of the image to the first area and the second area, respectively, by the polarization allocating portion to project the first projection laser beam and the second projection laser beam. According to this structure, polarization can be reliably switched by the polarization switching portion, utilizing the period of time in which the blank area is scanned by the scanning portion, and hence the first projection laser beam and the second projection laser beam can be reliably allocated.

Preferably, the aforementioned projector including the image synthesizing portion further includes image compression means compressing projected images vertically when the synthetic image is allocated to the first area and the second area to be projected. According to this structure, even if the intervals of the scanning lines are extended and the respective images are extended vertically when the synthetic image is generated by arranging the image corresponding to the first image signal only in the even row and arranging the image corresponding to the second image signal only in the odd row, for example, the image compression means can compress the extended images, and hence the images based on the input image signals can be displayed in a state close to the original images.

Preferably in this case, the image compression means includes an optical member capable of compressing the projected images vertically. According to this structure, the optical member having a simple structure can easily compress the image vertically.

Preferably in the aforementioned projector including the image compression means, the image compression means includes a scan control portion controlling driving of the scanning portion to compress the projected images vertically. According to this structure, the image can be easily compressed vertically by simply controlling the scanning portion by the scan control portion without providing a member such as the optical member.

Preferably, the aforementioned projector allocating the laser beams for at least one of each scanning section scanned by the scanning portion and each frame scanned by the scanning portion to project the laser beams is configured to allocate the first projection laser beam and the second projection laser beam to the first area and the second area, respectively, for each frame scanned by the scanning portion to project the first projection laser beam and the second projection laser beam. According to this structure, the projection laser beams based on the image signals different from each other can be projected on the areas different from each other for each frame scanned by the scanning portion, and hence different images can be easily displayed on the areas different from each other.

Preferably in this case, the projector further includes an image synthesizing portion generating a synthetic image on the basis of the first image signal and the second image signal, and is configured to allocate the first projection laser beam and the second projection laser beam to the first area and the second area, respectively, for each frame scanned by the scanning portion on the basis of the synthetic image to project the first projection laser beam and the second projection laser beam. According to this structure, the image synthesizing portion can synthesize different images into one image, and hence the projection laser beams of the different images can be easily scanned by the single scanning portion.

Preferably in the aforementioned projector according to the aspect, the projection laser beam generation portion includes two projection laser beam generation portions outputting the first projection laser beam and the second projection laser beam having wavelengths different from each other, and the projector further includes a diffraction grating allocating the first projection laser beam and the second projection laser beam having the wavelengths different from each other, output from the two projection laser beam generation portions to the first area and the second area, respectively, to project the first projection laser beam and the second projection laser beam. According to this structure, the first projection laser beam and the second projection laser beam having the wavelengths different from each other, output from the two projection laser beam generation portions can be easily allocated to the areas different from each other with the diffraction grating.

Preferably, the aforementioned projector according to the aspect is configured to project an operation image on the first area, and further includes a detection portion to detect the projection laser beam reflected by a detection object for operation when a user performs an operation on the first area. According to this structure, the detection portion detects the operation of the user when the user performs an operation of sliding a presentation on the operation image on the first area to make a presentation, for example, and hence a next slide can be displayed on the second area on the basis of the detection result. In other words, a result of the operation performed on the first area at hand can be reflected in the second area.

Preferably in this case, the projector is configured to project an operation object image on the second area, and further includes a control portion performing control of reflecting a result of the operation of the user on the first area in the operation object image projected on the second area on the basis of a detection result when the operation of the user on the first area is detected by the detection portion. According to this structure, the result of the operation performed on the first area at hand can be easily reflected in the second area by the control portion.

MODES FOR CARRYING OUT THE INVENTION

Embodiments of the present invention are now described on the basis of the drawings.

First Embodiment

First, a projector 100 according to a first embodiment of the present invention is described with reference to FIGS. 1 to 3.

Figure 1:
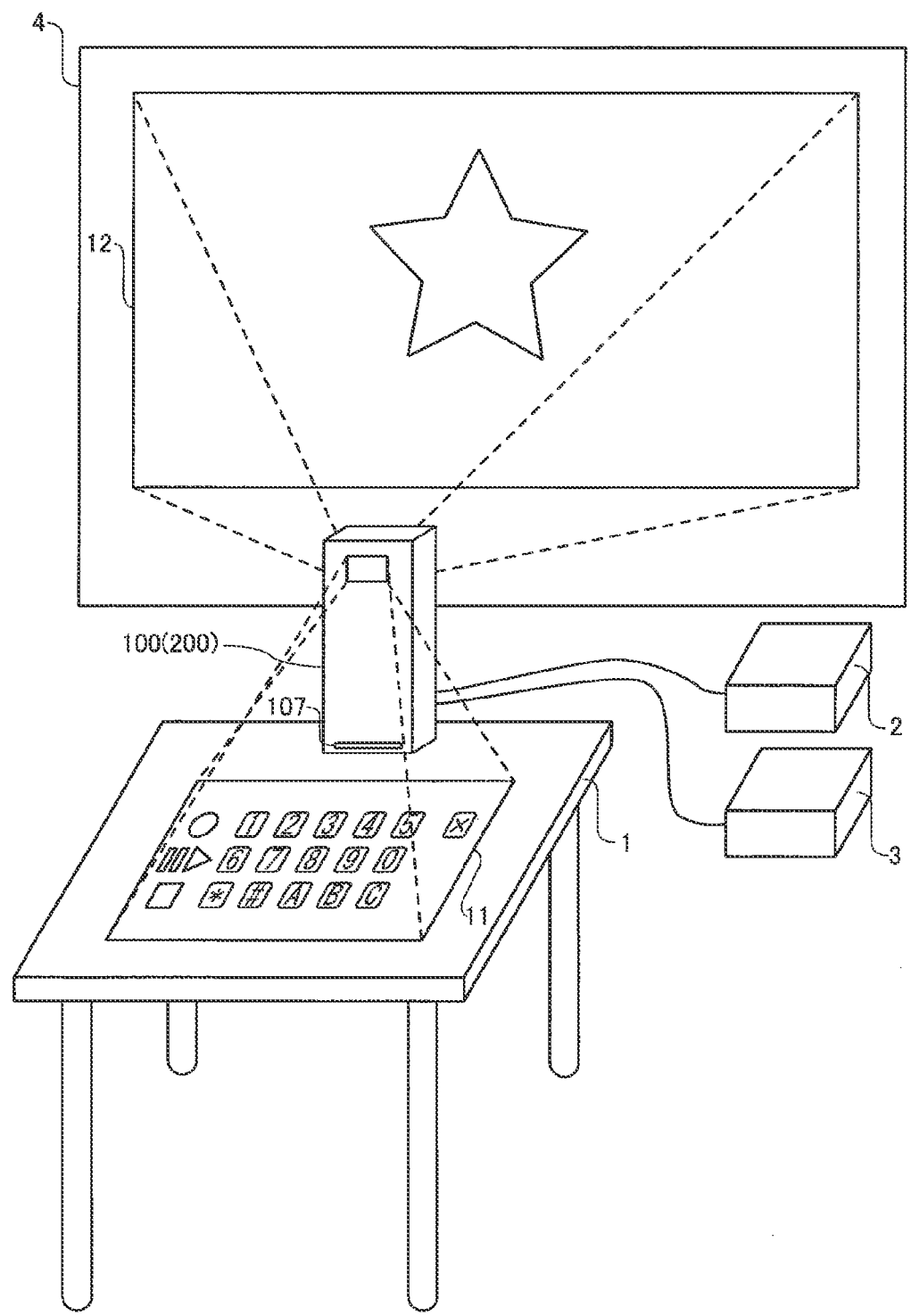
FIG. 1 A schematic view showing a used state of a projector according to a first embodiment of the present invention.

The projector 100 according to the first embodiment of the present invention is configured to be used in a state arranged on a table 1, as shown in FIG. 1. The projector 100 is connected with two image output apparatuses 2 and 3. The image output apparatuses 2 and 3 are configured to transmit image signals different from each other to the projector 100. The projector 100 is configured to be capable of displaying images different from each other on different areas. For example, the projector 100 is configured to display an operation projection image 11 input from the image output apparatus 2 on a projection area of the upper surface of the table 1. Furthermore, the projector 100 is configured to display a screen projection image 12 input from the image output apparatus 3 on a projection area such as a screen 4. A detection portion 107 is provided on a side surface of the projector 100 projecting the operation projection image 11. The upper surface of the table 1 and the screen 4 are examples of the "first area" and the "second area" in the present invention, respectively. The operation projection image 11 and the screen projection image 12 are examples of the "operation image" and the "operation object image" in the present invention, respectively.

Figure 2:
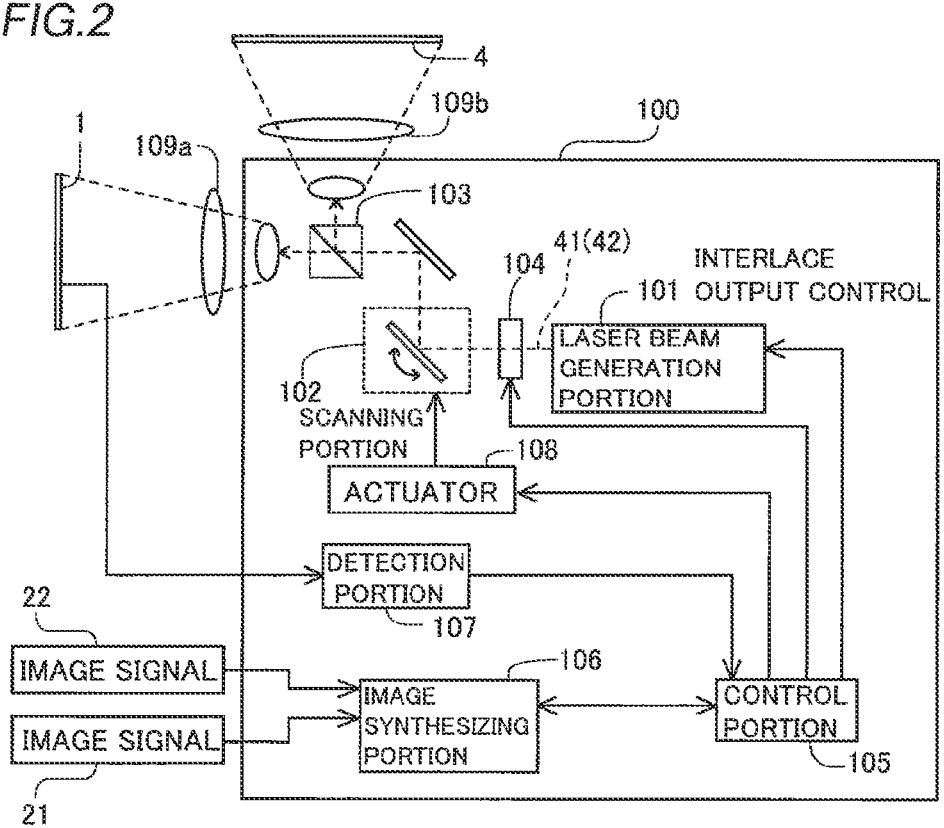
FIG. 2 A block diagram showing the structure of the projector according to the first embodiment of the present invention.
Figure 3:
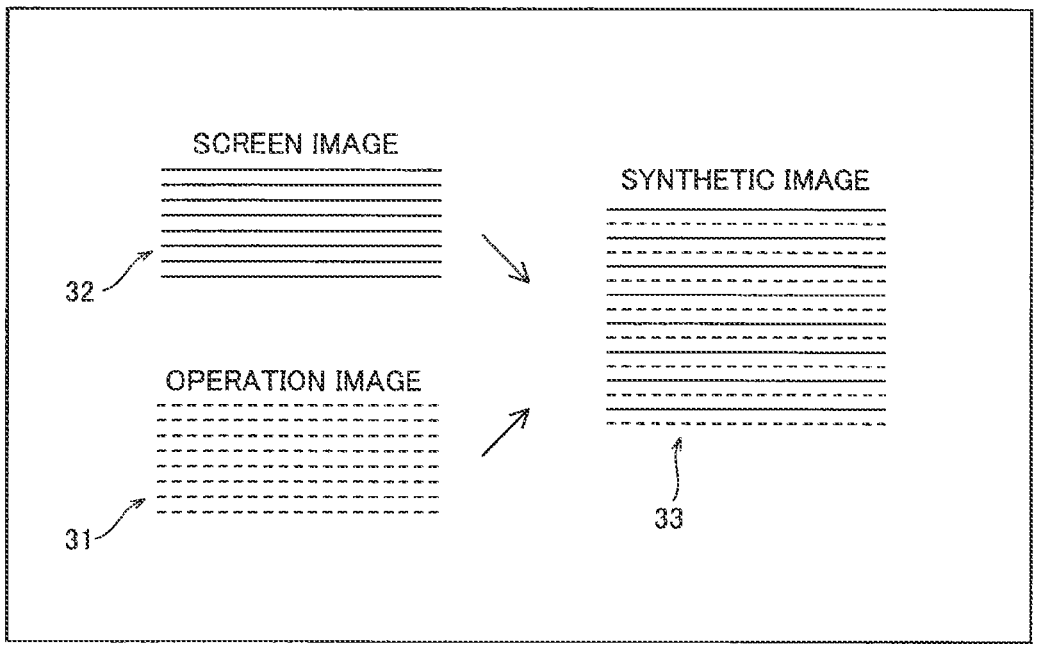
FIG. 3 A diagram for illustrating image synthesis performed by an image synthesizing portion of the projector according to the first embodiment of the present invention.

As shown in FIG. 2, the projector 100 mainly includes a laser beam generation portion 101, a scanning portion 102, a polarizing beam splitter 103, a polarization switching element 104, a control portion 105, an image synthesizing portion 106, the detection portion 107, an actuator 108, and lenses 109a and 109b. The laser beam generation portion 101 is an example of the "projection laser beam generation portion" in the present invention, and the polarizing beam splitter 103 is an example of the "polarization allocating portion" in the present invention. The polarization switching element 104 is an example of the "polarization switching portion" in the present invention, and the lenses 109a and 109b are examples of the "image compression means" or the "optical member" in the present invention.

The laser beam generation portion 101 is configured to output a laser beam 41 and a laser beam 42 corresponding to an image signal 21 input from the image output apparatus 2 and an image signal 22 input from the image output apparatus 3, respectively. The laser beam generation portion 101 is configured to output the laser beam 41 and the laser beam 42 with P-polarization. The image signal 21 and the image signal 22 are examples of the "first image signal" and the "second image signal" in the present invention, respectively. The laser beam 41 and the laser beam 42 are examples of the "first projection laser beam" and the "second projection laser beam" in the present invention, respectively.

The scanning portion 102 is configured to scan the laser beam 41 and the laser beam 42. The scanning portion 102 includes a MEMS mirror and is configured to scan the laser beam 41 and the laser beam 42 by driving the MEMS mirror horizontally and vertically. Furthermore, the scanning portion 102 is configured to be driven horizontally and vertically by the actuator 108. In addition, the scanning portion 102 is configured to scan the laser beam 41 and the laser beam 42 horizontally and vertically. Moreover, the scanning portion 102 is configured to scan even rows (odd rows) in an interlaced format starting scanning of the even rows (odd rows) after scanning all odd rows (even rows) of scanning lines of one image.

The polarizing beam splitter 103 is configured to allocate the laser beam 41 and the laser beam 42 to the upper surface of the table 1 and the screen 4, respectively, to project the laser beam 41 and the laser beam 42. Specifically, the polarizing beam splitter 103 is configured to allocate the laser beam 41 and the laser beam 42 to the upper surface of the table 1 and the screen 4, respectively, by transmitting or reflecting the laser beams according to the polarization of the incident laser beams to project the laser beam 41 and the laser beam 42. The polarizing beam splitter 103 transmits an incident P-polarized laser beam and reflects an incident S-polarized laser beam. According to the first embodiment, the polarization switching element 104 described later switches the laser beam 41 to a P-polarized beam and switches the laser beam 42 to an S-polarized beam. The P-polarized beam and the S-polarized beam are examples of the "first polarized beam" and the "second polarized beam" in the present invention, respectively.

The polarization switching element 104 is configured to switch the polarization of the laser beam 41 and the laser beam 42 to P-polarization and S-polarization, respectively. The polarization switching element 104 includes a liquid crystal element or a Faraday element. The polarization switching element 104 is configured to keep the laser beam 41, which is output as a P-polarized beam by the laser beam generation portion 101, P-polarized and allow passage of the laser beam 41 and to switch the laser beam 42 output as a P-polarized beam by the laser beam generation portion 101 to an S-polarized beam and allow passage of the laser beam 42.

The control portion 105 is configured to control each part of the projector 100. The control portion 105 controls the laser beam generation portion 101 to output laser beams corresponding to a synthetic image 33. Furthermore, the control portion 105 is configured to control driving of the scanning portion 102 by controlling the actuator 108. The control portion 105 controls the polarization switching element 104 to switch the laser beam 41 and the laser beam 42 to a P-polarized beam and an S-polarized beam, respectively.

The image synthesizing portion 106 is configured to generate a synthetic image on the basis of the image signal 21 and the image signal 22. As shown in FIG. 3, the image synthesizing portion 106 is configured to generate the synthetic image 33 on the basis of the image signal 21 corresponding to an operation image 31 output from the image output apparatus 2 and the image signal 22 corresponding to a screen image 32 output from the image output apparatus 3. Specifically, the image synthesizing portion 106 generates the synthetic image 33 by arranging the operation image 31 of the image output apparatus 2 in the even rows of the scanning lines and arranging the screen image 32 of the image output apparatus 3 in the odd rows of the scanning lines.

The detection portion 107 is configured to detect the laser beam 41 reflected by the finger of a user performing an operation on the upper surface of the table 1. Specifically, the detection portion 107 is configured to detect positional information of the finger of the user on the basis of that the laser beam 41 is reflected by the finger of the user on the operation projection image 11 on the upper surface of the table 1 and transmit the detected positional information to the control portion 105. The finger of the user is an example of the "detection object" in the present invention.

The lenses 109a and 109b are provided as image compression means compressing projected images vertically when the synthetic image 33 is allocated to the upper surface of the table 1 and the screen 4 to be projected. Furthermore, the lenses 109a and 109b are configured to be movable by an unshown actuator. The lenses 109a and 109b are configured to be inserted on the optical axes of the laser beam 41 and the laser beam 42, respectively, when the intervals of the scanning lines are extended so that displayed images are extended vertically.

Second, the operation of the projector 100 according to the first embodiment of the present invention is described with reference to FIGS. 1 to 6.

First of all, the image signal 21 corresponding to the operation image 31 is input into the projector 100 from the image output apparatus 2. In addition, the image signal 22 corresponding to the screen image 32 is input into the projector 100 from the image output apparatus 3. Next, the image synthesizing portion 106 generates the synthetic image 33 from the operation image 31 and the screen image 32. At this time, the image synthesizing portion 106 generates the synthetic image 33 by arranging the operation image 31 in the even rows of the scanning lines and arranging the screen image 32 in the odd rows of the scanning lines.

Then, the control portion 105 controls the scanning portion 102 to scan the even rows (odd rows) in an interlaced format starting scanning of the even rows (odd rows) after scanning all the odd rows (even rows) of the scanning lines of one synthetic image 33. In parallel with this, the control portion 105 controls the laser beam generation portion 101 to output P-polarized laser beams.

The laser beam generation portion 101 outputs the laser beam 42 corresponding to the image signal 22 for scanning all the odd rows of the synthetic image 33. Then, the laser beam generation portion 101 outputs the laser beam 41 corresponding to the image signal 21 for scanning all the even rows of the synthetic image 33 with a vertical blanking interval therebetween. At this time, the P-polarized laser beam 42 and the P-polarized laser beam 41 are output.

The polarization switching element 104 switches the laser beam 42 from a P-polarized beam to an S-polarized beam. On the other hand, the laser beam 41 remains P-polarized and passes through the polarization switching element 104. Detailedly, the control portion 105 controls the laser beam 42 scanned in the odd rows to become S-polarized and controls the laser beam 41 scanned in the even rows to become P-polarized by switching the polarization of the polarization switching element 104 in the vertical blanking interval between scanning of the odd rows and scanning of the even rows.

Then, the scanning portion 102 scans the laser beam 41 and the laser beam 42 passing through the polarization switching element 104 in a scanning section of the even rows and a scanning section of the odd rows, respectively.

Thereafter, the polarizing beam splitter 103 allocates the S-polarized laser beam 42 and the P-polarized laser beam 41. Specifically, the S-polarized laser beam 42 is reflected by the polarizing beam splitter 103 whereas the P-polarized laser beam 41 passes through the polarizing beam splitter 103. Thus, the polarizing beam splitter 103 allocates the P-polarized laser beam 41 and the S-polarized laser beam 42 to project the same on the upper surface of the table 1 and the screen 4, respectively.

Figure 4:
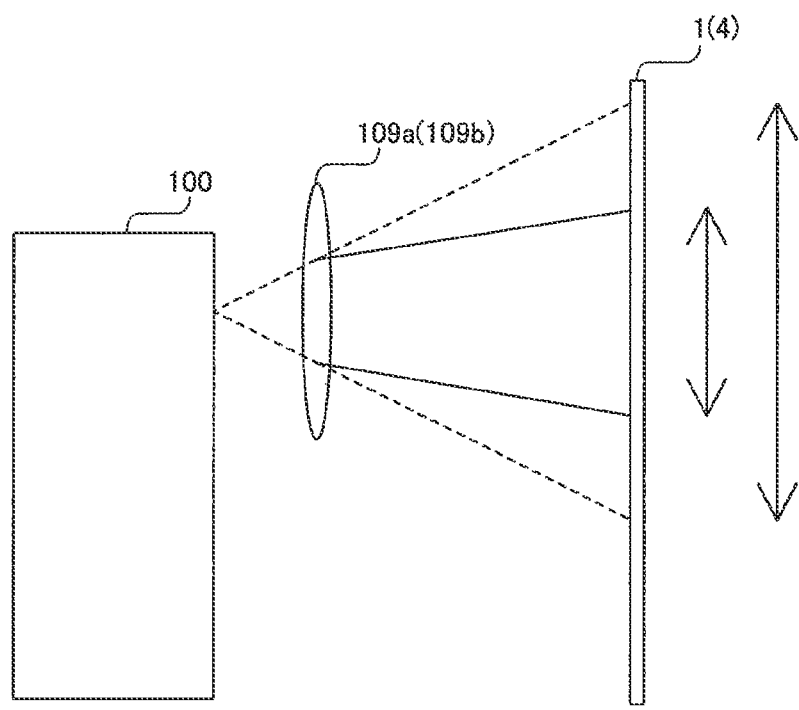
FIG. 4 A diagram showing a lens of the projector according to the first embodiment of the present invention.
Figure 5:
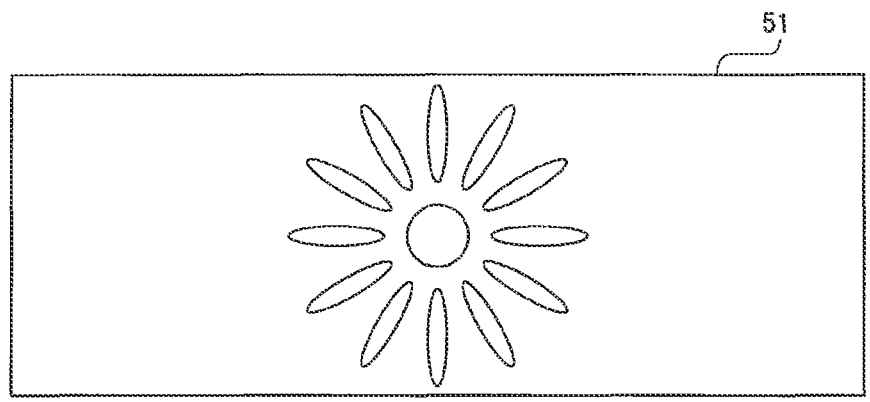
FIG. 5 A diagram showing an original image input into the projector according to the first embodiment of the present invention.
Figure 6:
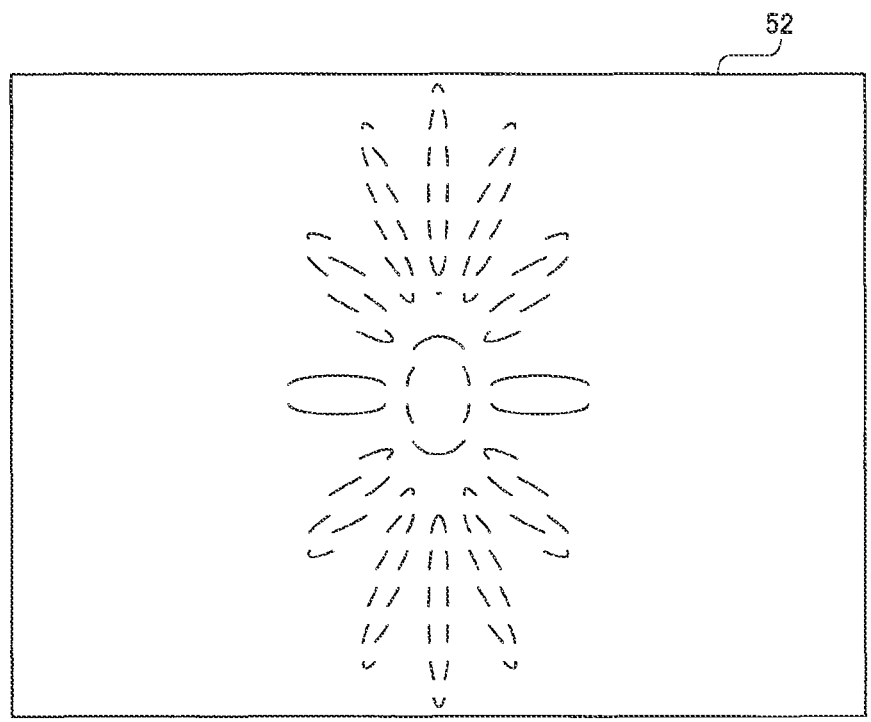
FIG. 6 A diagram showing a state where the image input into the projector according to the first embodiment of the present invention is extended vertically.

As shown in FIG. 4, the laser beam 42 allocated by the polarizing beam splitter 103 passes through the lens 109b compressing an image vertically and is projected on the screen 4. The laser beam 41 allocated by the polarizing beam splitter 103 passes through the lens 109a compressing an image vertically and is projected on the upper surface of the table 1. When an image 51 shown in FIG. 5 is synthesized as the operation image 31 (screen image 32) by the image synthesizing portion 106, the scanning line intervals of even rows (odd rows) of a synthetic image are large as compared with the scanning line intervals of the image 51, so that the image is extended vertically as an image 52 shown in FIG. 6 if the image is projected without any change. Therefore, it is necessary to project the laser beam 41 (42) after causing the laser beam 41 (42) to pass through the lens 109a (109b) compressing the image vertically.

In like manner subsequently, operation images 31 based on successive image signals 21 and screen images 32 based on successive image signals 22 are continuously displayed on the upper surface of the table 1 and the screen 4, respectively.

According to the first embodiment, as hereinabove described, the projector 100 is configured to allocate the laser beam 41 corresponding to the image signal 21 and the laser beam 42 corresponding to the image signal 22 different from the image signal 21 to the upper surface of the table 1 and the screen 4 not overlapping with the upper surface of the table 1, respectively, to project the laser beam 41 and the laser beam 42. Thus, the laser beams 41 and 42 based on the image signals 21 and 22 different from each other can be projected on the areas (the upper surface of the table 1 and the screen 4) different from each other, and hence different images can be displayed on the areas different from each other.

According to the first embodiment, as hereinabove described, the projector 100 is configured to allocate the laser beam 41 and the laser beam 42 to the upper surface of the table 1 and the screen 4, respectively, for each scanning section scanned by the scanning portion 102 to project the laser beam 41 and the laser beam 42. Thus, the laser beam 41 and the laser beam 42 based on the image signals 21 and 22 different from each other can be projected on the areas (the upper surface of the table 1 and the screen 4) different from each other for each scanning section scanned by the scanning portion 102, and hence different images can be easily displayed on the areas different from each other.

According to the first embodiment, as hereinabove described, the projector 100 is provided with the polarization switching element 104 switching the polarization of the laser beam 41 and the polarization of the laser beam 42 to P-polarization and S-polarization, respectively, and the polarizing beam splitter 103 allocating the P-polarized beam and the S-polarized beam to the upper surface of the table 1 and the screen 4, respectively, to project the P-polarized beam and the S-polarized beam. Thus, the polarizing beam splitter 103 can allocate the laser beam 41 and the laser beam 42 to the upper surface of the table 1 and the screen 4, respectively, according to whether the polarization is P-polarization or S-polarization.

According to the first embodiment, as hereinabove described, the projector 100 is provided with the image synthesizing portion 106 generating the synthetic image 33 on the basis of the image signal 21 and the image signal 22 and is configured to allocate the laser beam 41 and the laser beam 42 to the upper surface of the table 1 and the screen 4, respectively, for each scanning section scanned by the scanning portion 102 on the basis of the synthetic image 33 to project the laser beam 41 and the laser beam 42. Thus, the image synthesizing portion 106 can synthesize different images into one image, and hence projection laser beams of the different images can be easily scanned by the single scanning portion 102.

According to the first embodiment, as hereinabove described, the image synthesizing portion 106 is configured to generate the synthetic image 33 by arranging the image corresponding to the image signal 21 in the even rows and arranging the image corresponding to the image signal 22 in the odd rows, and the scanning portion 102 is configured to scan the even rows and the odd rows in an interlaced format. Furthermore, the projector 100 is configured to allocate the laser beam 41 scanned in the scanning section of the even rows and the laser beam 42 scanned in the scanning section of the odd rows to the upper surface of the table 1 and the screen 4, respectively, to project the laser beam 41 and the laser beam 42. Thus, in scanning in an interlaced format starting scanning of the even rows (odd rows) after scanning of all the odd rows (even rows) of the scanning lines of one image, scanning of the screen image 32 corresponding to the image signal 22 arranged in the odd rows (the operation image 31 corresponding to the image signal 21 arranged in the even rows) of one synthetic image 33 is all finished, and thereafter scanning of the operation image 31 corresponding to the image signal 21 arranged in the even rows (the screen image 32 corresponding to the image signal 22 arranged in the odd rows) is started. Consequently, for one synthetic image 33, only a single allocation operation is required, and different images can be easily displayed on the areas different from each other.

According to the first embodiment, as hereinabove described, the projector 100 is provided with the polarization switching element 104 switching the polarization of the laser beam 41 and the polarization of the laser beam 42 to P-polarization and S-polarization, respectively, and the polarizing beam splitter 103 allocating the P-polarized beam and the S-polarized beam to the upper surface of the table 1 and the screen 4, respectively, to project the P-polarized beam and the S-polarized beam. Furthermore, the projector 100 is configured to switch P-polarization and S-polarization in the vertical blanking interval by the polarization switching element 104 and allocate the P-polarized laser beam 41 scanned in the scanning section of the even rows and the S-polarized laser beam 42 scanned in the scanning section of the odd rows to the upper surface of the table 1 and the screen 4, respectively, by the polarizing beam splitter 103 to project the P-polarized laser beam 41 and the S-polarized laser beam 42. Thus, the polarization switching element 104 can switch polarization, utilizing the vertical blanking interval in which no scanning is performed, and hence the laser beam 41 and the laser beam 42 can be allocated without providing a period of time for switching polarization.

According to the first embodiment, as hereinabove described, the projector 100 is provided with the lenses 109a and 109b capable of compressing the projected images vertically as the image compression means vertically compressing the images projected by allocating the synthetic image 33 to the upper surface of the table 1 and the screen 4. Thus, even when the intervals of the scanning lines are extended so that the respective images are extended vertically, the lenses 109a and 109b can compress the extended images, and hence the images based on the input image signals can be displayed in a state close to the original images. In addition, the lenses 109a and 109b each having a simple structure are employed as the image compression means, whereby the images can be easily compressed vertically.

According to the first embodiment, as hereinabove described, the projector 100 is configured to project the operation image 31 on the upper surface of the table 1 and is provided with the detection portion 107 to detect the laser beam 41 reflected by the finger of the user for operation when the user performs an operation on the upper surface of the table 1. Thus, the detection portion detects the operation of the user when the user performs an operation of sliding a presentation on the upper surface of the table 1 to make a presentation, for example, and hence a next slide can be displayed on the screen 4 on the basis of the detection result. In other words, a result of the operation performed on the upper surface of the table 1 at hand can be reflected in the screen 4.

According to the first embodiment, as hereinabove described, the projector 100 is configured to project the screen projection image 12 on the screen 4 and is provided with the control portion 105 performing control of reflecting a result of the operation of the user on the upper surface of the table 1 in the screen projection image 12 projected on the screen 4 on the basis of a detection result when the operation of the user on the upper surface of the table 1 is detected by the detection portion 107. Thus, the result of the operation performed on the upper surface of the table 1 at hand can be easily reflected in the screen 4 by the control portion 105.

Second Embodiment

A projector 200 according to a second embodiment of the present invention is now described with reference to FIGS. 7 and 8. An example of performing image synthesis by arranging two images different from each other in an upper portion and a lower portion is described in this second embodiment, dissimilarly to the first embodiment in which image synthesis is performed by arranging the two images different from each other in the even rows and the odd rows.

Figure 7:
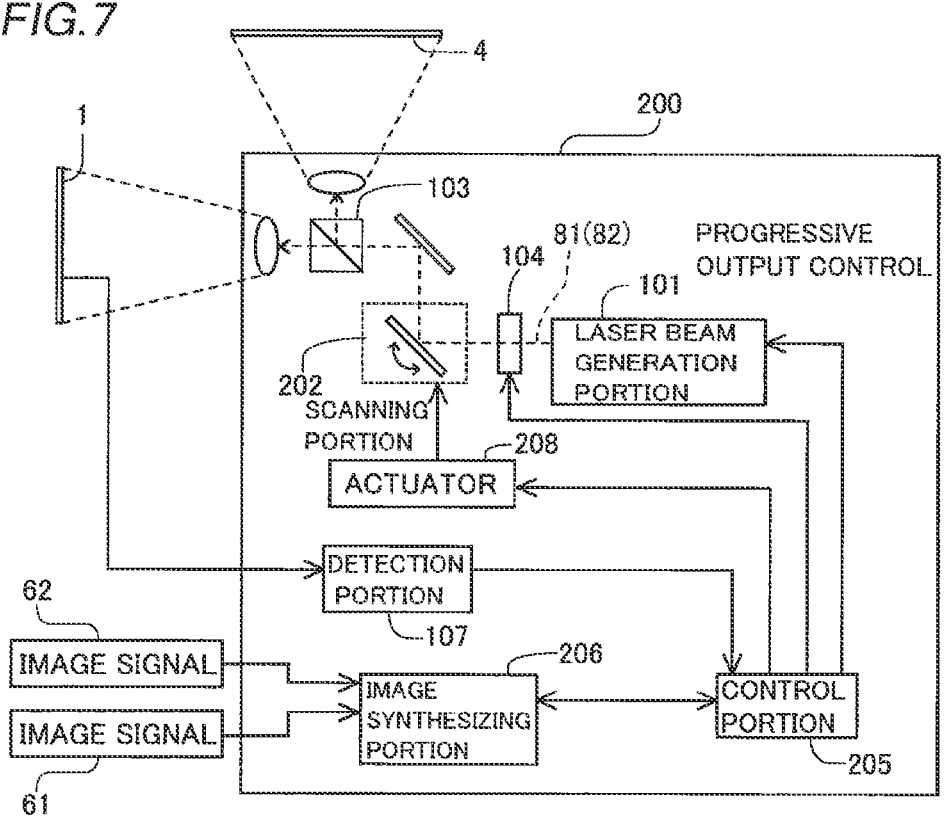
FIG. 7 A block diagram showing the structure of a projector according to a second embodiment of the present invention.
Figure 8:
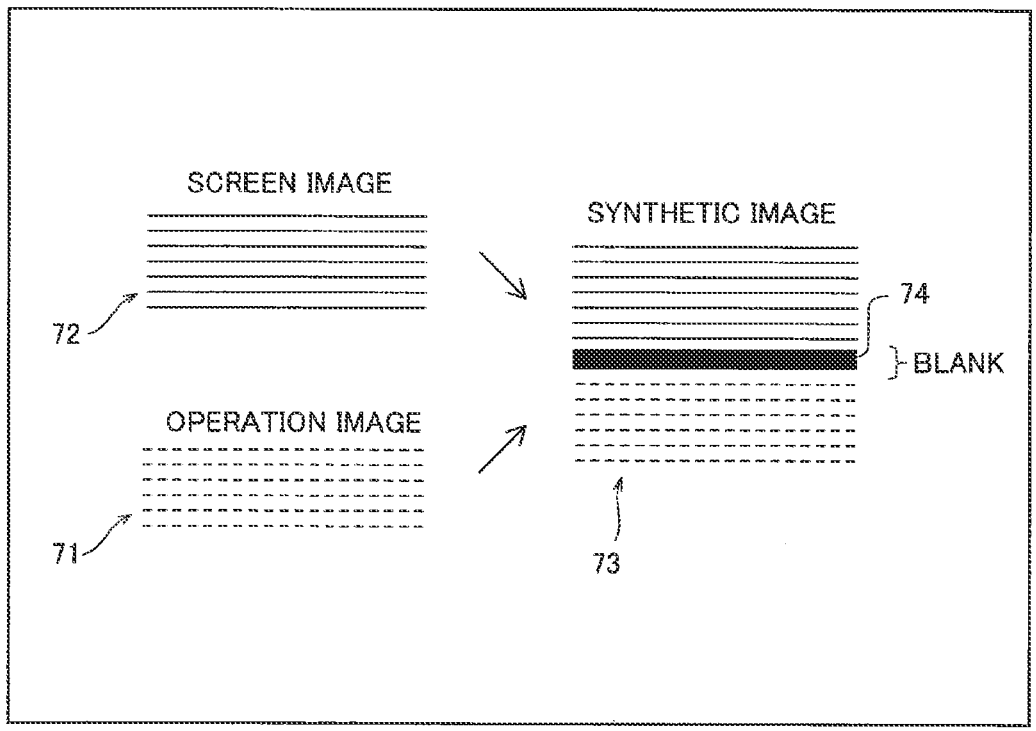
FIG. 8 A diagram for illustrating image synthesis performed by an image synthesizing portion of the projector according to the second embodiment of the present invention.

The projector 200 according to the second embodiment of the present invention mainly includes a laser beam generation portion 101, a scanning portion 202, a polarizing beam splitter 103, a polarization switching element 104, a control portion 205, an image synthesizing portion 206, a detection portion 107, and an actuator 208, as shown in FIG. 7.

The laser beam generation portion 101 is configured to output a laser beam 81 and a laser beam 82 corresponding to an image signal 61 input from an image output apparatus 2 and an image signal 62 input from an image output apparatus 3, respectively. The laser beam generation portion 101 is configured to output the laser beam 81 and the laser beam 82 with P-polarization. The image signal 61 and the image signal 62 are examples of the "first image signal" and the "second image signal" in the present invention, respectively. The laser beam 81 and the laser beam 82 are examples of the "first projection laser beam" and the "second projection laser beam" in the present invention, respectively.

The scanning portion 202 is configured to scan the laser beam 81 and the laser beam 82. The scanning portion 202 includes a MEMS mirror and is configured to scan the laser beam 81 and the laser beam 82 by driving the MEMS mirror horizontally and vertically. The scanning portion 202 is configured to be driven horizontally and vertically by the actuator 208. Furthermore, the scanning portion 202 is configured to scan the laser beam 81 and the laser beam 82 horizontally and vertically. In addition, the scanning portion 202 is configured to scan the laser beam 81 and the laser beam 82 in a progressive format in which scanning lines of one image are scanned row by row from above.

The polarizing beam splitter 103 is configured to allocate the laser beam 81 and the laser beam 82 to the upper surface of a table 1 and a screen 4, respectively, to project the laser beam 81 and the laser beam 82. Specifically, the polarizing beam splitter 103 is configured to allocate the laser beam 81 and the laser beam 82 to the upper surface of the table 1 and the screen 4, respectively, by transmitting or reflecting the laser beams according to the polarization of the incident laser beams to project the laser beam 81 and the laser beam 82. The polarizing beam splitter 103 transmits an incident P-polarized laser beam and reflects an incident S-polarized laser beam.

According to the second embodiment, the polarization switching element 104 switches the laser beam 81 to a P-polarized beam and switches the laser beam 82 to an S-polarized beam, as described later.

The polarization switching element 104 is configured to switch the polarization of the laser beam 81 and the laser beam 82 to P-polarization and S-polarization, respectively. The polarization switching element 104 includes a liquid crystal element or a Faraday element. The polarization switching element 104 is configured to keep the laser beam 81, which is output as a P-polarized beam by the laser beam generation portion 101, P-polarized and allow passage of the laser beam 81 and to switch the laser beam 82 output as a P-polarized beam by the laser beam generation portion 101 to an S-polarized beam and allow passage of the laser beam 82.

The control portion 205 is configured to control each part of the projector 200. The control portion 205 controls the laser beam generation portion 101 to output laser beams corresponding to a synthetic image 33. Furthermore, the control portion 205 is configured to control driving of the scanning portion 202 by controlling the actuator 208. In addition, the control portion 205 controls the polarization switching element 104 to switch the laser beam 81 and the laser beam 82 to a P-polarized beam and an S-polarized beam, respectively.

According to the second embodiment, the image synthesizing portion 206 is configured to generate a synthetic image on the basis of the image signal 61 and the image signal 62. As shown in FIG. 8, the image synthesizing portion 206 is configured to generate a synthetic image 73 on the basis of the image signal 61 corresponding to an operation image 71 output from the image output apparatus 2 and the image signal 62 corresponding to a screen image 72 output from the image output apparatus 3. Specifically, the image synthesizing portion 206 generates the synthetic image 73 by arranging the operation image 71 of the image output apparatus 2 in the lower portion and arranging the screen image 72 of the image output apparatus 3 in the upper portion through a blank area 74. Scanning lines of the operation image 71 (screen image 72) as well as scanning lines of the lower portion (upper portion) of the synthetic image 73 are separated by one row from each other, so that the scanning lines of the operation image 71 (screen image 72) and the scanning lines of the lower portion (upper portion) of the synthetic image 73 are not different from each other. Thus, the image is not extended vertically also when the image is projected.

The detection portion 107 is configured to detect the laser beam 81 reflected by the finger of a user performing an operation on the upper surface of the table 1. Specifically, the detection portion 107 is configured to detect positional information of the finger of the user on the basis of that the laser beam 81 is reflected by the finger of the user on an operation projection image 11 on the upper surface of the table 1 and transmit the detected positional information to the control portion 205.

The operation of the projector 200 according to the second embodiment of the present invention is now described with reference to FIGS. 1, 7, and 8.

First of all, the image signal 61 corresponding to the operation image 71 is input into the projector 200 from the image output apparatus 2. In addition, the image signal 62 corresponding to the screen image 72 is input into the projector 200 from the image output apparatus 3. Next, the image synthesizing portion 206 generates the synthetic image 73 from the operation image 71 and the screen image 72. At this time, the image synthesizing portion 206 generates the synthetic image 73 by arranging the operation image 71 in the lower portion and arranging the screen image 72 in the upper portion. The synthetic image 73 is generated in a state where the blank area 74 is arranged between the image arranged in the upper portion and the image arranged in the lower portion.

Then, the control portion 205 controls the scanning portion 202 to perform a scan in a progressive format in which scanning lines of one synthetic image 73 are scanned row by row from above. In parallel with this, the control portion 205 controls the laser beam generation portion 101 to output P-polarized laser beams.

The laser beam generation portion 101 outputs the laser beam 82 corresponding to the image signal 62 for scanning the upper portion of the synthetic image 73. Then, the laser beam generation portion 101 outputs the laser beam 81 corresponding to the image signal 61 for scanning the lower portion of the synthetic image 73 through a period of time in which the blank area is scanned. At this time, the laser beam 42 and the laser beam 41 both are output with P-polarization.

The polarization switching element 104 switches the laser beam 82 from a P-polarized beam to an S-polarized beam. On the other hand, the laser beam 81 remains P-polarized and passes through the polarization switching element 104. Detailedly, the control portion 205 controls the laser beam 82 scanned in the upper portion to become S-polarized and controls the laser beam 81 scanned in the lower portion to become P-polarized by switching the polarization of the polarization switching element 104 in the period of time between scanning of the upper portion and scanning of the lower portion in which the blank area 74 is scanned.

Then, the scanning portion 202 scans the laser beam 81 and the laser beam 82 passing through the polarization switching element 104 in a scanning section of the lower portion of the image and a scanning section of the upper portion of the image, respectively.

Thereafter, the polarizing beam splitter 103 allocates the S-polarized laser beam 82 and the P-polarized laser beam 81. Specifically, the S-polarized laser beam 82 is reflected by the polarizing beam splitter 103 whereas the P-polarized laser beam 81 passes through the polarizing beam splitter 103. Thus, the polarizing beam splitter 103 allocates the P-polarized laser beam 81 and the S-polarized laser beam 82 to project the same on the upper surface of the table 1 and the screen 4, respectively.

In like manner subsequently, operation images 71 based on successive image signals 61 and screen images 72 based on successive image signals 62 are continuously displayed on the upper surface of the table 1 and the screen 4, respectively.

According to the second embodiment, as hereinabove described, the image synthesizing portion 206 is configured to generate the synthetic image 73 by arranging the operation image 71 corresponding to the image signal 61 in the lower portion and arranging the screen image 72 corresponding to the image signal 62 in the upper portion, and the scanning portion 202 is configured to perform a scan in a progressive format. Furthermore, the projector 200 is configured to allocate the laser beam 81 scanned in the scanning section of the lower portion of the synthetic image 73 and the laser beam 82 scanned in the scanning section of the upper portion of the synthetic image 73 to the upper surface of the table 1 and the screen 4, respectively, to project the laser beam 81 and the laser beam 82. Thus, in scanning in a progressive format in which even rows and odd rows are alternately scanned row by row when one image is scanned, scanning of the screen image 72 corresponding to the image signal 62 arranged in the upper portion (the operation image 71 corresponding to the image signal 61 arranged in the lower portion) of one synthetic image 73 is all finished, and thereafter scanning of the operation image 71 corresponding to the image signal 61 arranged in the lower portion (the screen image 72 corresponding to the image signal 62 arranged in the upper portion) is started. Consequently, for one synthetic image 73, only a single allocation operation is required, and different images can be easily displayed on the areas different from each other.

According to the second embodiment, as hereinabove described, the projector 200 is provided with the polarization switching element 104 switching the polarization of the laser beam 81 and the polarization of the laser beam 82 to P-polarization and S-polarization, respectively, and the polarizing beam splitter 103 allocating the P-polarized beam and the S-polarized beam to the upper surface of the table 1 and the screen 4, respectively, to project the P-polarized beam and the S-polarized beam, and the image synthesizing portion 206 is configured to synthesize images in the state where the blank area 74 is arranged between the image arranged in the upper portion and the image arranged in the lower portion. Furthermore, the projector 200 is configured to switch P-polarization and S-polarization during scanning of the blank area 74 by the polarization switching element 104 and allocate the P-polarized laser beam 81 scanned in the scanning section of the lower portion of the image and the S-polarized laser beam 82 scanned in the scanning section of the upper portion of the image to the upper surface of the table 1 and the screen 4, respectively, by the polarizing beam splitter 103 to project the P-polarized laser beam 81 and the S-polarized laser beam 82. Thus, polarization can be reliably switched by the polarization switching element 104, utilizing the period of time in which the blank area 74 is scanned by the scanning portion 202, and hence the laser beam 81 and the laser beam 82 can be reliably allocated.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of using the lenses 109*a* and 109*b* to compress the vertically extended image has been shown in the aforementioned first embodiment, the present invention is not restricted to this. According to the present invention, concave mirrors may be used instead of the lenses 109*a* and 109*b*.

Figure 9:
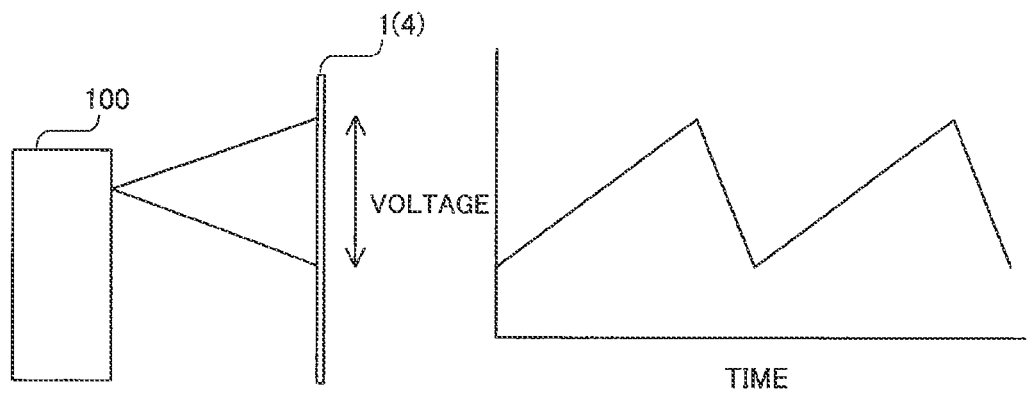
FIG. 9 A diagram showing a state where the driving sensitivity of a scanning portion of a projector according to a first modification of the first embodiment of the present invention is large.
Figure 10:
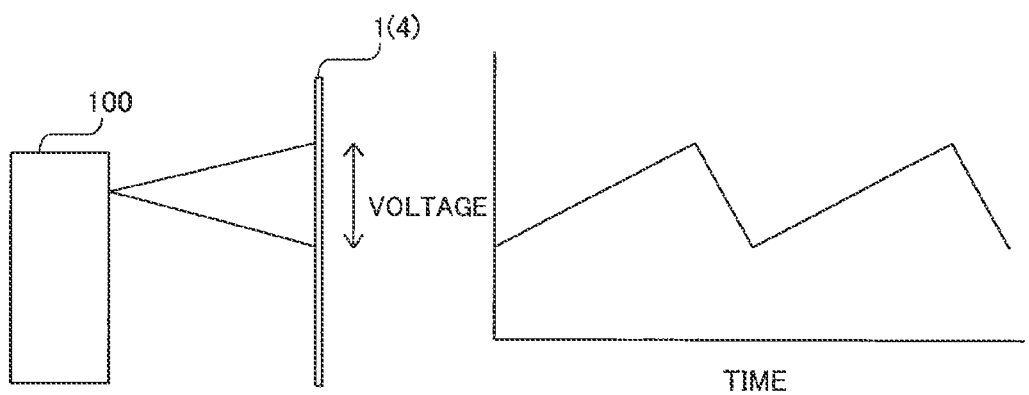
FIG. 10 A diagram showing a state where the driving sensitivity of the scanning portion of the projector according to the first modification of the first embodiment of the present invention is small.

While the example of employing the lenses 109*a* and 109*b* compressing the vertically extended image as the image compression means has been shown in the aforementioned first embodiment, the present invention is not restricted to this. According to the present invention, a control portion 105 may be employed as the image compression means, as in a first modification shown in FIGS. 9 and 10. Specifically, the control portion 105 may be configured to control the driving sensitivity of a scanning portion 102 by varying a rate of change of voltage over time and to compress the image vertically. In this case, the control portion 105 is an example of the "image compression means" in the present invention as well as an example of the "scan control portion" in the present invention. According to this structure, the image can be easily compressed vertically by simply controlling the scanning portion 102 by the control portion 105 without providing any optical members such as the lenses 109*a* and 109*b*.

Figure 11:
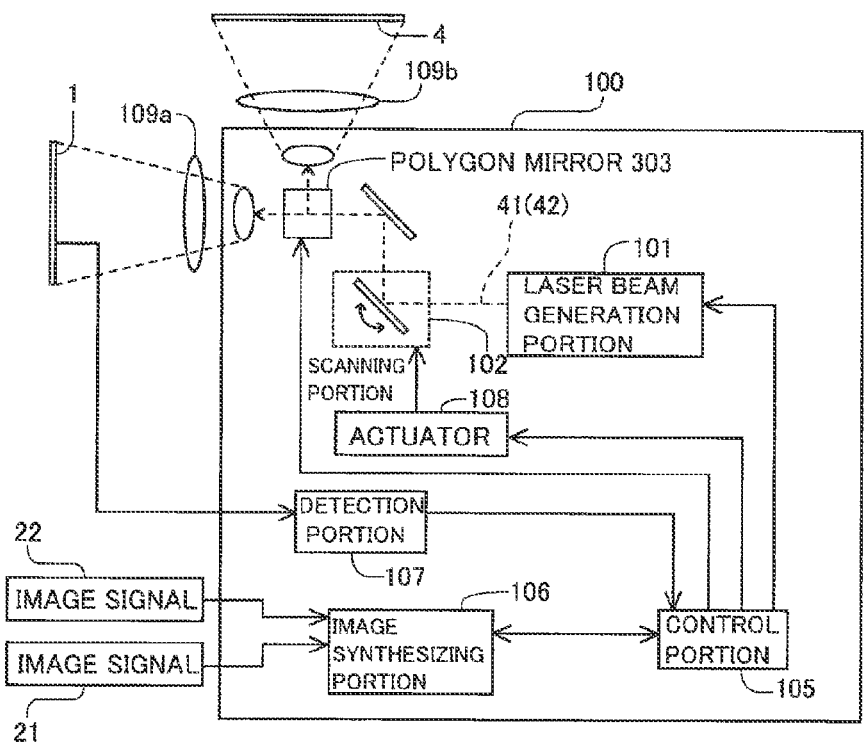
FIG. 11 A block diagram showing the structure of a projector according to a second modification of each of the first and second embodiments of the present invention.

While the example of using the polarization switching element 104 and the polarizing beam splitter 103 to allocate the laser beam 41 (81) and the laser beam 42 (82) to project the same has been shown in each of the aforementioned first and second embodiments, the present invention is not restricted to this. According to the present invention, a polygon mirror 303 may be used to allocate a laser beam 41 (81) and a laser beam 42 (82) by changing a reflection direction by the polygon mirror 303 for each of the laser beam 41 (81) and the laser beam 42 (82) to project the laser beam 41 (81) and the laser beam 42 (82) instead of the polarization switching element 104 and the polarizing beam splitter 103, as in a second modification shown in FIG. 11.

While the example of using the polarizing beam splitter 103 to allocate the laser beam 41 (81) and the laser beam 42 (82) to project the same has been shown in each of the aforementioned first and second embodiments, the present invention is not restricted to this. According to the present invention, a half mirror may be used to allocate the laser beam (81) and the laser beam 42 (82). The half mirror is an example of the "polarization allocating portion" in the present invention.

Figure 12:
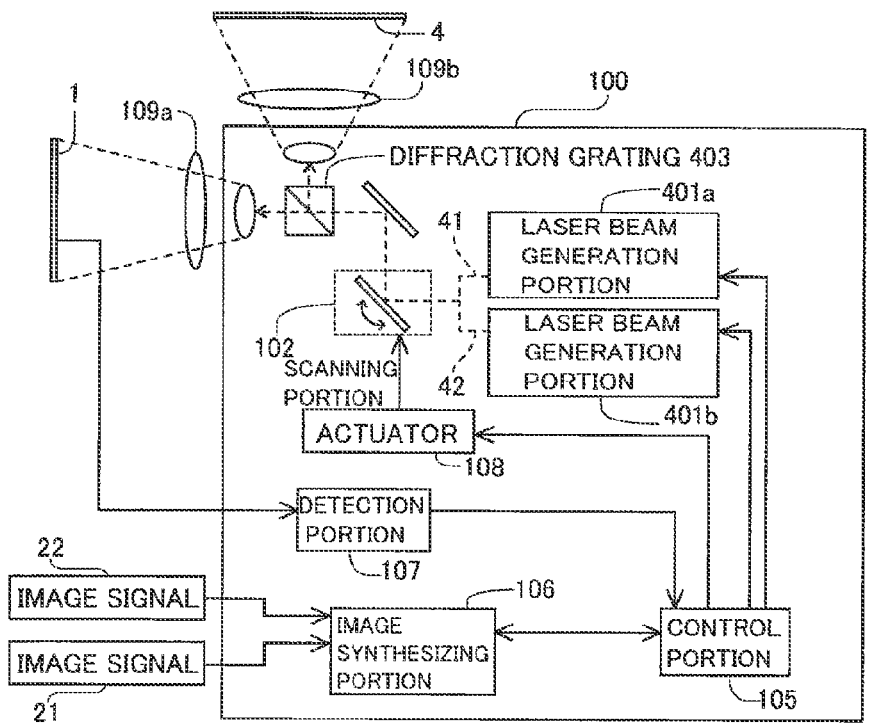
FIG. 12 A block diagram showing the structure of a projector according to a third modification of each of the first and second embodiments of the present invention.

While the example of using the polarization switching element 104 (204) and the polarizing beam splitter 103 (203) to allocate the laser beam 41 (81) and the laser beam 42 (82) to project the same has been shown in each of the aforementioned first and second embodiments, the present invention is not restricted to this. According to the present invention, two laser beam generation portions 401*a* and 402*b* may be provided to allocate a laser beam 41 (81) and a laser beam 42 (82) generated by the respective laser beam generation portions 401*a* and 402*b* with a diffraction grating 403 utilizing difference in wavelength by making the wavelengths of the laser beam 41 (81) and the laser beam 42 (82) different from each other to project the laser beam 41 (81) and the laser beam 42 (82), as in a third modification shown in FIG. 12. According to this structure, the laser beam 41 (81) and the laser beam 42 (82) having the wavelengths different from each other, output from the two projection laser beam generation portions 401*a* and 402*b* can be easily allocated to areas different from each other with the diffraction grating 403.

While the example of generating the synthetic image 33 (73) by arranging the two different images in the even rows and the odd rows of the image or arranging the two different images in the upper portion and the lower portion of the image when generating the synthetic image 33 (73) with the image synthesizing portion 106 (206) has been shown in each of the aforementioned first and second embodiments, the present invention is not restricted to this. According to the present invention, the two different images may be arranged in each scanning section other than the even rows and the odd rows or the upper portion and the lower portion to generate the synthetic image with the image synthesizing portion.

Figure 13:
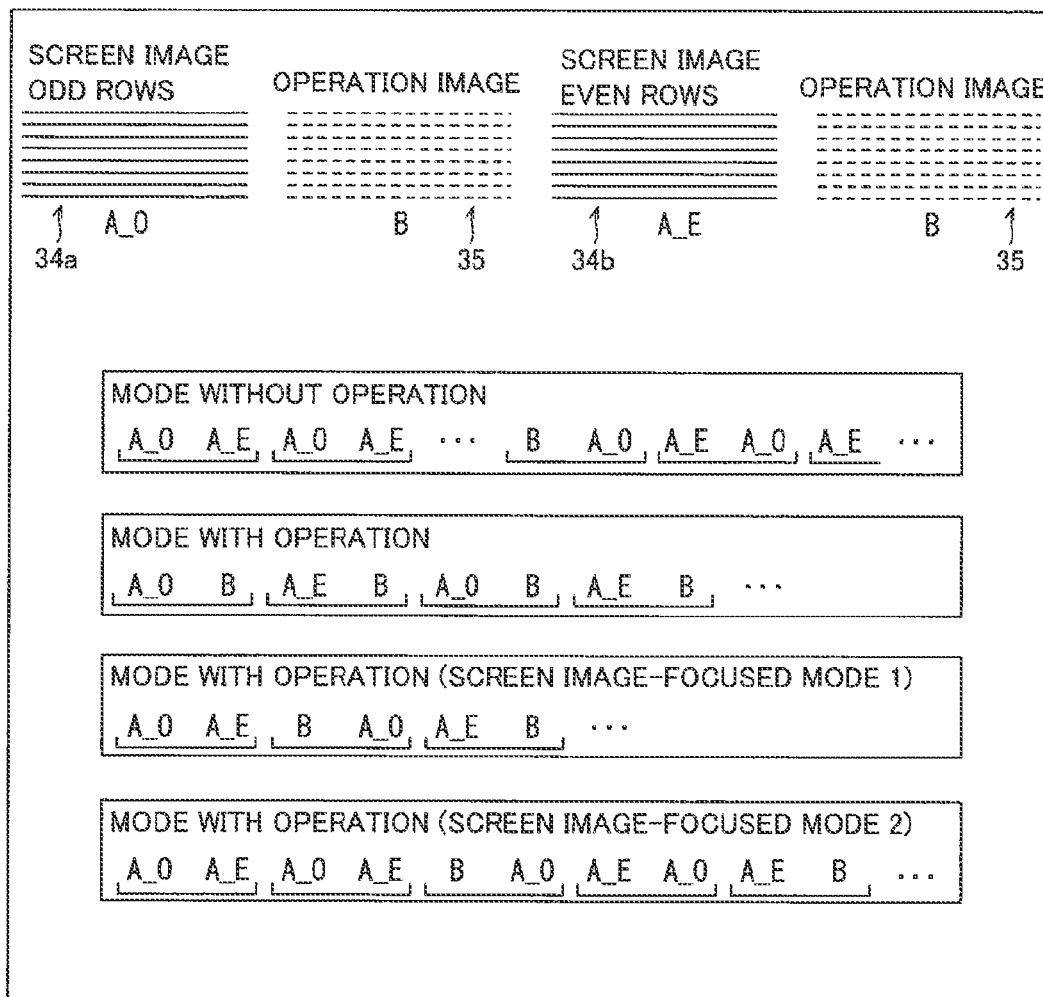
FIG. 13 A diagram for illustrating image synthesis performed by an image synthesizing portion according to a fourth modification of the first embodiment of the present invention.

While the example in which each synthetic image is constituted by the operation image 31 and the screen image 32 has been shown in the aforementioned first embodiment, the present invention is not restricted to this. According to the present invention, an image 34*a* corresponding to odd rows of a screen image displayed on a screen 4, an image 34*b* corresponding to even rows of the screen image displayed on the screen 4, and an operation image 35 displayed on the upper surface of a table 1 may be synthesized in different combinations according to display modes, as in a fourth modification shown in FIG. 13. For example, a synthetic image may be prepared with the image 34*a* or the image 34*b* and the image 35 at a rate of one image in one second between a plurality of synthetic images constituted by the image 34*a* and the image 34*b* in a mode without an operation in which the user performs no operation at hand. Thus, the operation image 35 is displayed on the upper surface of the table 1 at a low rate of once a second. Furthermore, each synthetic image may be constituted by the image 34*a* or the image 34*b* and the image 35, and the image 35 may be regularly displayed in a mode with an operation in which the user performs an operation at hand. In addition, when the screen image is focused in the mode with an operation, a rate of incorporating the image 35 into the synthetic image may be adjusted to display the screen image more clearly. In this case, it is not necessary to compress the screen image vertically.

While the example of regularly generating the synthetic image 73 by arranging the two different images in the upper portion and the lower portion when generating the synthetic image 73 with the image synthesizing portion 206 has been shown in the aforementioned second embodiment, the present invention is not restricted to this. According to the present invention, an operation mode and a non-operation mode may be switchable, and the screen image 72 and the operation image 71 may be arranged in the upper portion and the lower portion, respectively, to regularly synthesize the images in the operation mode whereas the screen image may be displayed on the screen 4, and the screen image 72 and the operation image 71 may be arranged in the upper portion and the lower portion, respectively, at a rate of about one image in one second to synthesize the images in the non-operation mode, for example.

Figure 14:
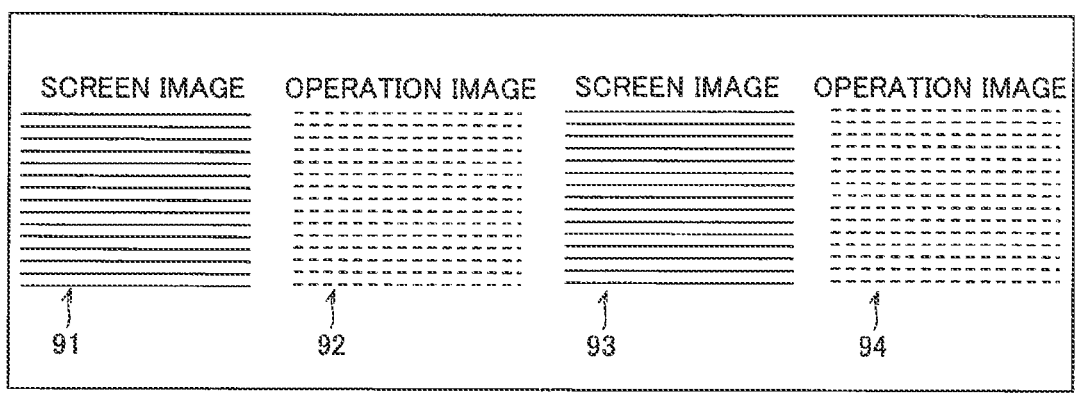
FIG. 14 A diagram for illustrating image synthesis performed by an image synthesizing portion according to a fifth modification of each of the first and second embodiments of the present invention.

While the example of synthesizing the operation image (71) and the screen image 32 (72) for each scanning section and allocating the laser beam 41 (81) and the laser beam 42 (82) for each scanning section to project the same has been shown in each of the aforementioned first and second embodiments, the present invention is not restricted to this. According to the present invention, an operation image 92 (94) and a screen image (93) may be allocated for each frame to be displayed on the upper surface of a table 1 and a screen 4, respectively, as in a fifth modification shown in FIG. 14.

While the example of displaying the operation image 31 (71) on the upper surface of the table 1 and displaying the screen image 32 (72) on the screen 4 has been shown in each of the aforementioned first and second embodiments, the present invention is not restricted to this. According to the present invention, different images for players may be displayed on two screens, respectively, for a fighting game, for example.

While the example of displaying the two different images on the two areas has been shown in each of the aforementioned first and second embodiments, the present invention is not restricted to this. According to the present invention, more than two different images may be displayed on more than two areas.

While the example of using the finger of the user to perform an operation has been shown in each of the aforementioned first and second embodiments, the present invention is not restricted to this. According to the present invention, a pen, a pointer, or the like may be used to perform an operation.

While the example of using the upper surface of the table 1 as the first area and using the screen 4 as the second area has been shown in each of the aforementioned first and second embodiments, the present invention is not restricted to this. According to the present invention, both the first area and the second area may be the upper surfaces of tables, or both may be screens. Alternatively, walls or the like may be used instead of the upper surface of the table and the screen.

What is claimed is:

1. A projector comprising:
   a projection laser beam generation portion outputting a first projection laser beam and a second projection laser beam corresponding to a first image signal and a second image signal different from the first image signal, which are input, respectively;
   an image synthesizing portion generating a synthetic image on the basis of the first image signal and the second image signal;
   a single scanning portion scanning the first projection laser beam and the second projection laser beam;
   a switching portion switching a polarization or a wavelength of the first projection laser beam or the second projection laser beam outputted from the projection laser beam generation portion; and
   an allocating portion allocating the first projection laser beam and the second projection laser beam, respectively, according to the polarization or the wavelength of the laser beam to project the first projection laser beam and the second projection laser beam;
   wherein the projector that allocated the first projection laser beam and the second projection laser beam both scanned by the scanning portion, respectively, to project the first projection laser beam and the second projection laser beam.

2. The projector according to claim 1, wherein:
   the projector that allocated the first projection laser beam and the second projection laser beam, respectively, for at least one of a scanning section scanned by the scanning portion and a frame scanned by the scanning portion to project the first projection laser beam and the second projection laser beam.

3. The projector according to claim 1, wherein:
   the switching portion includes a polarization switching portion switching the first projection laser beam and the second projection laser beam to a first polarized beam and a second polarized beam, respectively; and
   the allocating portion includes a polarization allocating portion allocating the first polarized beam and the second polarized beam, respectively, to project the first polarized beam and the second polarized beam.

4. The projector according to claim 3, wherein:
   the first polarized beam includes a P-polarized beam, and the second polarized beam includes an S-polarized beam;
   the polarization switching portion switches the first projection laser beam and the second projection laser beam to the p-polarized beam and the S-polarized beam, respectively; and
   the polarization allocating portion allocates the P-polarized beam and the S-polarized beam, respectively, to project the P-polarized beam and the S-polarized beam.

5. The projector according to claim 3, wherein the polarization switching portion includes either a liquid crystal element or a Faraday element.

6. The projector according to claim 3, wherein the polarization allocating portion includes either a polarizing beam splitter or a half mirror.

7. The projector according to claim 2, wherein:
   the projector that allocated the first projection laser beam and the second projection laser beam, respectively, for the scanning section scanned by the scanning portion to project the first projection laser beam and the second projection laser beam.

8. The projector according to claim 7, further comprising:
   an image synthesizing portion generating a synthetic image on the basis of the first image signal and the second image signal;
   wherein the projector that allocated the first projection laser beam and the second projection laser beam, respectively, for the scanning section scanned by the scanning portion on the basis of the synthetic image to project the first projection laser beam and the second projection laser beam.

9. The projector according to claim 8, wherein:
the image synthesizing portion generates the synthetic image by arranging an image corresponding to the first image signal in an even row and arranging an image corresponding to the second image signal in an odd row; and
the scanning portion performs a scan in an interlaced format;
wherein the projector that allocated the first projection laser beam scanned in a scanning section of the even row and the second projection laser beam scanned in a scanning section of the odd row, respectively, to project the first projection laser beam and the second projection laser beam.

10. The projector according to claim 9, wherein:
the switching portion includes a polarization switching portion switching the first projection laser beam and the second projection laser beam to a first polarized beam and a second polarized beam, respectively; and
the allocating portion includes a polarization allocating portion allocating the first polarized beam and the second polarized beam, respectively, to project the first polarized beam and the second polarized beam;
wherein the projector switches the first polarized beam and the second polarized beam in a vertical blanking interval by the polarization switching portion and allocate the first projection laser beam including the first polarized beam scanned in the scanning section of the even row and the second projection laser beam including the second polarized beam scanned in the scanning section of the odd row, respectively, by the polarization allocating portion to project the first projection laser beam and the second projection laser beam.

11. The projector according to claim 8, wherein:
the image synthesizing portion generates the synthetic image by arranging an image corresponding to the first image signal in a lower portion and arranging an image corresponding to the second image signal in an upper portion; and
the scanning portion performs a scan in a progressive format;
wherein the projector that allocated the first projection laser beam scanned in a scanning section of the lower portion of the synthetic image and the second projection laser beam scanned in a scanning section of the upper portion of the synthetic image, respectively, to project the first projection laser beam and the second projection laser beam.

12. The projector according to claim 11, wherein:
the switching portion includes a polarization switching portion switching the first projection laser beam and the second projection laser beam to a first polarized beam and a second polarized beam, respectively; and
the allocating portion includes a polarization allocating portion allocating the first polarized beam and the second polarized beam, respectively, to project the first polarized beam and the second polarized beam; wherein
the image synthesizing portion synthesizes images in a state where a blank area is arranged between the image arranged in the upper portion and the image arranged in the lower portion; and wherein
the projector switches the first polarized beam and the second polarized beam in a period of time in which the blank area is scanned by the polarization switching portion and allocate the first projection laser beam including the first polarized beam scanned in the scanning section of the lower portion of the synthetic image and the second projection laser beam including the second polarized beam scanned in the scanning section of the upper portion of the synthetic image, respectively, by the polarization allocating portion to project the first projection laser beam and the second projection laser beam.

13. The projector according to claim 8, further comprising:
an image compression means compressing projected images vertically when the synthetic image is allocated to be projected.

14. The projector according to claim 13, wherein the image compression means includes an optical member capable of compressing the projected images vertically.

15. The projector according to claim 13, wherein the image compression means includes a scan control portion controlling driving of the scanning portion to compress the projected images vertically.

16. The projector according to claim 2, wherein the projector that allocated the first projection laser beam and the second projection laser beam, respectively, for the frame scanned by the scanning portion to project the first projection laser beam and the second projection laser beam.

17. The projector according to claim 16, further comprising:
an image synthesizing portion generating a synthetic image on the basis of the first image signal and the second image signal;
wherein the projector that allocated the first projection laser beam and the second projection laser beam, respectively, for the frame scanned by the scanning portion on the basis of the synthetic image to project the first projection laser beam and the second projection laser beam.

18. The projector according to claim 1, wherein:
the projection laser beam generation portion includes two projection laser beam generation portions outputting the first projection laser beam and the second projection laser beam having wavelengths different from each other,
the allocating portion includes a diffraction grating allocating the first projection laser beam and the second projection laser beam having the wavelengths different from each other, output from the two projection laser beam generation portions, respectively, to project the first projection laser beam and the second projection laser beam.

19. The projector according to claim 1, wherein:
the projector projects an operation image,
the projector further comprising a detection portion to detect the first projection laser beam reflected by a detection object for operation when a user performs an operation.

20. The projector according to claim 19, wherein:
the projector projects an operation object image,
the projector further comprising a control portion performing control of reflecting a result of the operation of the user in the operation object image projected on the basis of a detection result when the operation of the user is detected by the detection portion.

* * * * *